(12) United States Patent
Ait-Mokhtar (10) Patent No.: US 8,527,517 B1
(45) Date of Patent: Sep. 3, 2013

(54) EFFICIENT KNOWLEDGE BASE SYSTEM

(75) Inventor: Salah Ait-Mokhtar, Meylan (FR)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/410,827

(22) Filed: Mar. 2, 2012

(51) Int. Cl.
*G06F 17/30* (2006.01)

(52) U.S. Cl.
USPC .................................. 707/738; 707/E17.014

(58) Field of Classification Search
None
See application file for complete search history.

(56) References Cited

U.S. PATENT DOCUMENTS

| | | | |
|---|---|---|---|
| 7,707,160 B2 | 4/2010 | Tunstall-Pedoe | |
| 7,979,455 B2 | 7/2011 | Krishnamoorthy et al. | |
| 2006/0190461 A1* | 8/2006 | Schaefer | 707/100 |
| 2006/0235823 A1 | 10/2006 | Chong et al. | |
| 2009/0138498 A1 | 5/2009 | Krishnamoorthy et al. | |

OTHER PUBLICATIONS

Abadi, et al. "Scalable Semantic Web Data Management Using Vertical Partitioning", Sep. 23-28, 2007, VLDB'07, Vienna, Austria, pp. 1-12.
Abadi, et al. "SW-Store: a vertically partitioned DBMS for Semantic Web data management", The VLDB Journal, 2009, 18:385-406.
Haslhofer, et al. "Europeana RDF Store Report", University of Vienna, Mar. 8, 2011, pp. 1-30.
Pan, et al. DLDB: Extending Relational Databases to Support Semantic Web Queries, 2003, pp. 1-5, available at www.cse.lehigh.edu/~heflin/pubs/psss03-poster.pdf.
Schmidt, et al. "An Experimental Comparison of RDF data management approaches in a SPARQL benchmark scenario", pp. 1-16, Proc. 7th Intern'l Conf. on The Semantic Web, 2008.
Suchanek, et al. "YAGO: A core of semantic knowledge unifying WORDNET and Wikipedia", WWW 2007, May 8-12, 2007, Canada, pp. 1-10.
Alexaki, et al. "On Storing Voluminous RDF Descriptions: The case of Web Portal Catalogs", *4th International Workshop on the Web and Databases (WebDB)*, 2001, pp. 1-6.

\* cited by examiner

*Primary Examiner* — Anteneh Girma
(74) *Attorney, Agent, or Firm* — Fay Sharpe LLP (57) ABSTRACT

A knowledge base system is provided which includes a relations table which includes slots for a predicate identifier and first and second arguments of a respective relation. Each predicate identifier encodes a key for a respective entry in a predicate table. The predicate identifier also encodes argument types for the two arguments in the respective row of the relations table. Some of the argument types are associated with respective linked tables. This allows one of the arguments in a row of the relations table to serve as a key to an entry in the respective linked table on the condition that the predicate identifier for that row encodes the associated argument type.

27 Claims, 5 Drawing Sheets

EFFICIENT KNOWLEDGE BASE SYSTEM

BACKGROUND

The exemplary embodiment relates to data management and in particular, to a more efficient knowledge base system.

Relational databases are widely used for storing structured information, such as entities and relations involving these entities. Conventionally, in such a database, fields are represented as columns and records as rows of a first table. Some of these fields include identifiers (IDs) in the records in place of data. Another table stores the relation information for the IDs for that particular field. A relation database management system (RDBMS) using a structured query language (SQL) controls the creation and access to the data.

Large databases have been created using information extracted from freely available resources. For example, databases such as Yago, and DBpedia store information that has been automatically extracted from web-based resources, such as WordNet and Wikipedia, by parsing the information provided for many different entities. Others, such Freebase, rely on contributors to supply the information. Such resources can help in many knowledge-related tasks. For example, they can be used as training data for supervised knowledge extraction systems, or as background knowledge for coreference resolution and named entity disambiguation and linking.

As an example, online resources could be used to populate records of a table in a Knowledge Base (KB) corresponding to a relation of type "X was born in Y", where one field corresponds to the X entities, i.e., named entities, of type person, and another field corresponds to their respective birthplaces Y, which could be named entities of type "geographical location". The fields of this table could use an ID for each of the person names, which is used to retrieve the person name from a separate person name table, and an ID for each of the geographical locations, which is used to retrieve the geographical location. Given a query, "what is Picasso's birthplace?," in appropriate query language, the query system first accesses the person name table to find the ID for Picasso and then uses the "X was born in Y" table to find the ID of his birthplace. Finally, the geographical location table is accessed to find the name of the birthplace corresponding to the ID.

Another use of knowledge bases is to determine whether similar names in different documents refer to the same entity. For example one document may use a middle name or initial when referring to a named entity, whereas another does not. By looking at the properties of the two entities (the Y values in the above example), a decision can be made as to whether the documents refer to the same person.

The data available for creation of such databases contain millions of entities and often hundreds of millions of relations involving these entities. Hence, there has been an effort to provide an efficient storage of these resources that allows for fast loading and also fast query answering. One possible solution to the efficiency problem is to set up the KB system over a cluster of computers using data sharing, as is the case in NoSQL distributed DBMS. However, this increases the overall costs, both in terms of hardware and maintenance.

A system and method are provided which can improve the performance of KB systems on conventional hardware, particularly when dealing with large KBs.

BRIEF DESCRIPTION

In accordance with one aspect of the exemplary embodiment, a knowledge base system includes memory which stores a knowledge base and a knowledge base management system which includes instructions for at least one of adding relations to the knowledge base and querying the knowledge base. The knowledge base includes a relations table and a plurality of linked tables. A first of the linked tables is a predicate table. The relations table includes slots which, for each of a plurality of rows of the relations table, store a relation identifier, a predicate identifier, and first and second arguments of a respective relation. Each predicate identifier encodes a key for a respective entry in the predicate table, a first argument type for the first of the arguments in the respective row of the relations table, and a second argument type for the second of the arguments in the respective row of the relations table. The first and second argument types are selected from a predefined set of argument types, one of the argument types in the set being associated with a second of the linked tables. One or more of the first and second arguments in a row of the relations table serves as a key to an entry in the second linked table when the predicate identifier for that row encodes the associated argument type. A processor executes the instructions.

In another aspect, a method for generating a knowledge base system includes providing in memory a knowledge base which includes a relations table and a plurality of linked tables. A first of the linked tables is a predicate table. The relations table includes slots which, for each of a plurality of rows of the relations table, store a relation identifier, a predicate identifier, and first and second arguments of a respective relation. For each a plurality of candidate relations to be added to the knowledge base, where the candidate relation includes first and second arguments and a predicate which links the arguments, the method includes determining if the predicate in the relation exists in a predicate table and if so, retrieving a corresponding predicate identifier from the predicate table, determining if argument types of the first and second arguments in the candidate relation match respective argument types that are encoded in the predicate identifier. The argument types are selected from a finite set of argument types. If the argument types of the first and second arguments in the candidate relation match the argument types encoded in the predicate identifier, for at least one of the arguments in the candidate relation, the method includes determining if the argument exists in a respective linked table corresponding to the encoded argument type, and if so retrieving its identifier, and if the argument does not exist, adding the respective argument as a new entry in the entity table with a respective identifier. Where a record does not yet exist in the records table for the candidate relation, creating a new record in the records table which includes the argument identifier of the at least one argument and the retrieved predicate identifier.

In another aspect, a knowledge base stored in non-transitory memory includes a predicate table including for each of a set of entries, a respective predicate identifier. Each predicate identifier encodes an order number for the predicate, and first and second argument types for the predicate, the first and second argument types each being selected from a predefined set of argument types. A relations table includes slots which, for each of a plurality of rows of the relations table, store a respective one of the predicate identifiers, and first and second arguments of a respective relation. Each argument includes one of an argument identifier and a value. An entity table corresponds to one of the argument types in the set of argument types, the entity table comprising a set of entries, each entry comprising an entity identifier and a respective entity value. A string table corresponds to another of the argument types in the set of argument types, the string table comprising a set of entries, each entry comprising a string identifier and a respective string value. The first and second arguments in the relations table serve as a key to an entry in one of the entity table and the string table only when the corresponding argument type is encoded as the respective first or second argument type in the predicate identifier of the respective row.

DETAILED DESCRIPTION

Aspects of the exemplary embodiment relate to a system and method for building an efficient knowledge base (KB) system. The KB is backed by a knowledge base management system (KBMS), using a particular relational data schema that allows for the efficient storage of entities, predicates, string literals (or simply "strings"), numeric literals, and relations. In this schema, entities, predicates, string literals, and relations are stored as entries in separate tables with the row IDs being their internal IDs, while numeric values are directly stored within the relations of which they are arguments.

Experiments show that the exemplary system outperforms existing systems in performance of both loading and querying and in data compactness.

1. Terminology

Before presenting the details of the exemplary schema, several terms and concepts used are first defined.

In the Resource Description Framework (RDF), information is expressed in the form of triples. A triple includes three components:

1. A SUBJECT-which is an entity about which the triple speaks.

2. A PREDICATE-which denotes a property of the subject (corresponding mainly to the main verb and any auxiliaries that accompany the main verb).

3. An OBJECT-which is a value of the property.

As an example, an RDF triple could be (William Shakespeare, wasBornIn, Stratford-Upon-Avon) where William Shakespeare is the subject, Stratford-Upon-Avon is the object (sometimes referred to as a fact), and "was born in" is the predicate. One or more databases, such as Yago, DBpedia, or Freebase, can be used as the source of such knowledge for the present system.

As used herein, a RELATION is a labeled and directed link between two elements (referred to as arguments). The label is a predicate (pred) that denotes the property (e.g., wasBornIn or hasFamilyName). The two linked elements in the relation are the arguments of the relation; the first argument (arg1) is the SUBJECT and the second one is the OBJECT (arg2). In addition, the relation has a unique identifier (r) that can be used to refer to it in other relations (this is called reification), and may also have a probability or confidence score (score) that the relation is factually correct, which defaults to 1. A relation is therefore a 5-tuple (r, pred, arg1, arg2, score) and thus expands on the notion of the RDF triple.

The predicates in the relations are drawn from a finite set of predicates, such as from 10 to 1000 or up to 100 predicates. Examples of predicates which may be used include, for example: hasFamilyName: hasGivenName, bornIn, bornOnDate, isCitizenOf, hasPopulation, influences, hasRevenue, isMemberOf, locatedIn. The specific predicates used may be a function of the predicates used by the resource from which the information used to create the knowledge base are extracted.

Each of the arguments of a relation can be one of a finite set of types. In the exemplary embodiment, five types of argument are considered:

1. integer Arg-integer (short numeric string literals, such as integers and floating point values), 2. string literal Arg-string, 3. entity Arg-entity, 4. predicate Arg-predicate (so that things can be said about the predicates), and 5. relation Arg-relation (for reification).

Each type of argument is assigned is own identifier and at least some of the argument types are associated with a respective linked table in which arguments of that type are stored. All arguments in the knowledge base are assigned to one of the finite set of types.

An argument of the integer type Arg-integer can be number or floating point integer and can be a number whose range is less than the number of bytes allocated to arguments in the relations table (e.g. 8 bytes). Numerical strings that are greater in length can be stored as string literals.

An argument of the string type Arg-string can be any string of characters of any length, e.g., selected from the Unicode alphabet.

An argument of the predicate type Arg-predicate refers to another predicate, i.e., other than the one in the predicate part of the relation.

An argument of the entity type Arg-entity can be anything other than an integer, string, or predicate argument, such as a person name or location name.

An argument of the relation type Arg-relation can be anything to be specified about the relation, such as a date on which it was validated or the like, by linking the relation to another relation.

As will be appreciated, the method is not limited to any specific number of types of predicate argument and that fewer or more than these five types are contemplated. For example a date type argument could be considered.

2. Exemplary System

Figure 1:
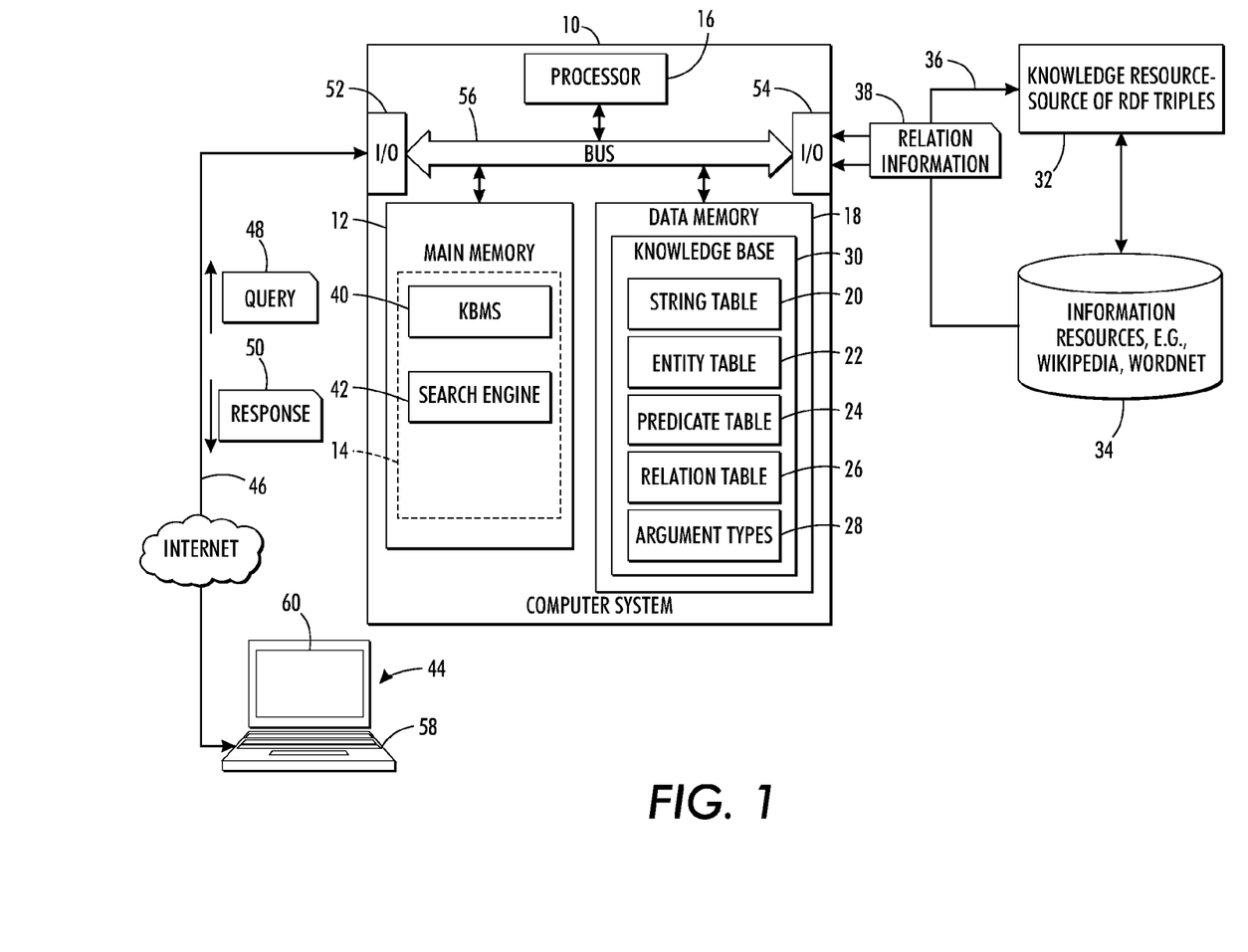
FIG. 1 is a schematic view of a system which incorporates a knowledge base in accordance with one aspect of the exemplary embodiment.

With reference to FIG. 1 an exemplary knowledge base system 10 which stores such relations is illustrated. The system includes memory 12 which stores instructions 14 for implementing the exemplary methods and a processor 16, in communication with the memory, which implements the instructions. Data memory 18 stores a set of tables 20, 22, 24, 26 generated in the method, including a string table 20, an entity table 22, a predicate table 24, and a relations table 26. Argument types and the tables to which they correspond are also stored at 28. These tables together make up a knowledge base (or relations database) 30.

In the relations table 26, each row contains five numerical slots (columns) corresponding to the 5-tuple discussed above:

(1) a relation identifier r used for reification;

(2) a predicate identifier p composed of an order number p' of the predicate and identifiers $t_1$ and $t_2$ of the types of the two arguments in the relation;

(3) an identifier a1 of the first argument arg1 (Subject) of the relation;

(4) an identifier (or value of) a2 of the second argument arg2 (Object) of the relation; and, optionally, (5) a confidence score for the relation (for dealing with uncertain relations; which defaults to 1).

Information used in creation of the knowledge base (KB) 30 can be obtained from a knowledge resource 32, such as a source of RDF triples, which in turn, may use an information resource, such as Wikipedia or WordNet or information submitted by contributors. Alternatively or additionally, the system 10 may use contributor-supplied information or access resources 34 directly using appropriate algorithms for extracting information. Knowledge resource 32 and/or information resource 34 can be linked to the system 10 by wired or wireless links 36, such as the Internet, for supplying relation information 38. In other embodiments, a user inputs information 38 to the system.

The system memory 12 stores a knowledge base management system (KBMS) 40, for creation of the tables 20, 22, 24, 26 from relation information 38 and for accessing the information stored therein. The KBMS can be configured similarly to existing RDBMS, except as noted. A search engine 42 is provided for generating a query in a suitable language to be understood by the KBMS For example, the system 10 may be linked to a client device 44 by a suitable link, such as a wired or wireless link 46. A user of the client device submits a query 48 to the system search engine 42 and receives one or more responses 50 to the query based on the stored information in the KB 30.

The system 10 includes one or more input/output devices 52, 54 for communicating with external devices 32, 34, 46. Hardware components 12, 16, 18, 52, 54 of the system 10 may communicate via a system bus 56.

The computer system 10 may comprise one or more computing devices, such as a desktop, a laptop, palmtop computer, portable digital assistant (FDA), server computer, cellular telephone, tablet computer, pager, combination thereof, or other computing device(s) capable of executing instructions for performing the exemplary method.

The memory 12, 18 may represent any type of non-transitory computer readable medium such as random access memory (RAM), read only memory (ROM), magnetic disk or tape, optical disk, flash memory, or holographic memory. In one embodiment, the memory 12, 18 comprises a combination of random access memory and read only memory. In some embodiments, the processor 16 and memory 12 and/or 18 may be combined in a single chip. The network interface 52, 54 allows the computer to communicate with other devices via a computer network, such as a local area network (LAN) or wide area network (WAN), or the internet, and may comprise a modulator/demodulator (MODEM).

The digital processor 16 can be variously embodied, such as by a single-core processor, a dual-core processor (or more generally by a multiple-core processor), a digital processor and cooperating math coprocessor, a digital controller, or the like. The digital processor 16, in addition to controlling the operation of the computer 10, executes instructions stored in memory 12 for performing the method outlined in one or more of FIGS. 2, 4 and 5.

The client device 44 may be similarly equipped with memory and a processor, as well as one or more user input devices 58, such as a keyboard, touch screen, cursor control device, for inputting queries, and a display screen 60, or other output device, for outputting the response 50 in human-recognizable form. In the exemplary embodiment, a server 10 and client device 44 are illustrated. However, it is to be appreciated that the system 10 may alternatively be hosted by the client device 44. In some embodiments, the system 10 may be distributed over two or more computing devices.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

3. Exemplary Method for Creation of the Knowledge Base 30

Figure 2:
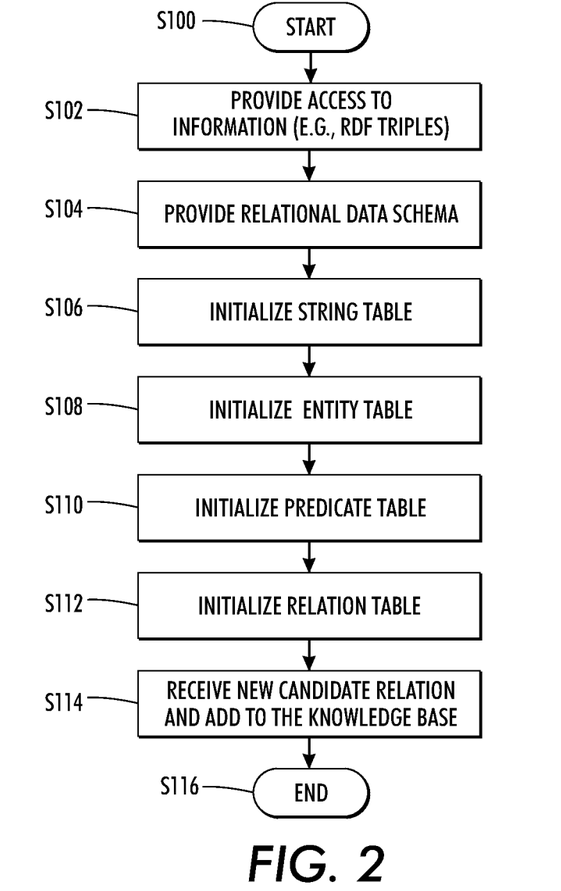
FIG. 2 is a flow diagram which illustrates a method for creating a knowledge base in accordance with another aspect of the exemplary embodiment.

FIG. 2 illustrates an exemplary method for creation of a knowledge base 30 which can be performed with the system of FIG. 1.

The method begins at S100.

At S102, access to a knowledge resource 32 or other source of information 38 is provided.

At S104, relational schema for the knowledge base 30 are defined. The relational schema defines the constraints on each of the tables 20, 22, 24, 26, and a set of argument types 28, each type being assigned its own type identifier t.

At S106, the string table 20 is initialized, which initially may be empty. The string table 20 is configured for storing strings (string literals), which are of for the argument type "string". Each new string identified in subsequently input information is assigned its own string identifier s. No two strings in the string table 20 have the same string ID s.

At S108, the entity table 22 is initialized, which initially may be empty. The entity table 22 is configured for storing entities, which are of the argument type "entity". Each new entity extracted from the resource 32 is assigned its own entity ID e. No two entities in the entity table have the same ID e.

At S110, the predicate table 24 is initialized for storing predicates, which initially may be empty. Each new predicate extracted from the knowledge resource 32 is assigned an order number identifier p'. A predicate identifier p is then composed from p' and its two argument types $t_1$ and $t_2$.

At S112, the relations table 26 is initialized. Each new relation extracted from knowledge resource 32 is assigned an individual relation identifier r. No two relations in the relations table have the same identifier r.

At S114 a relation of the type (predicate,argument1,argument2,score) is received and added to the knowledge base 30. Further details on this step are described with reference to FIG. 4.

Step S114 can be repeated for each new relation added to the knowledge base.

The method ends at S116.

Further details of the system and method now follow.

4. Detailed Relational Schema

The database schema of the knowledge base system 10 is its structure described in a formal language, such as SQL, or a variant thereof, supported by the knowledge base management system 40. The exemplary relational schema includes four tables 20, 22, 24, 26 to store string literals, entities, predicates and relations and their unique identifiers. Each ID can be an integer. Integers of up to $2^{64}$ bits in length are generally sufficient to individually identify all the entities in the knowledge base 30. Numeric string literals (integers and floating point values) can be inlined in the relations table, that is, they are directly stored within the relations in which they are arguments.

Figure 3:
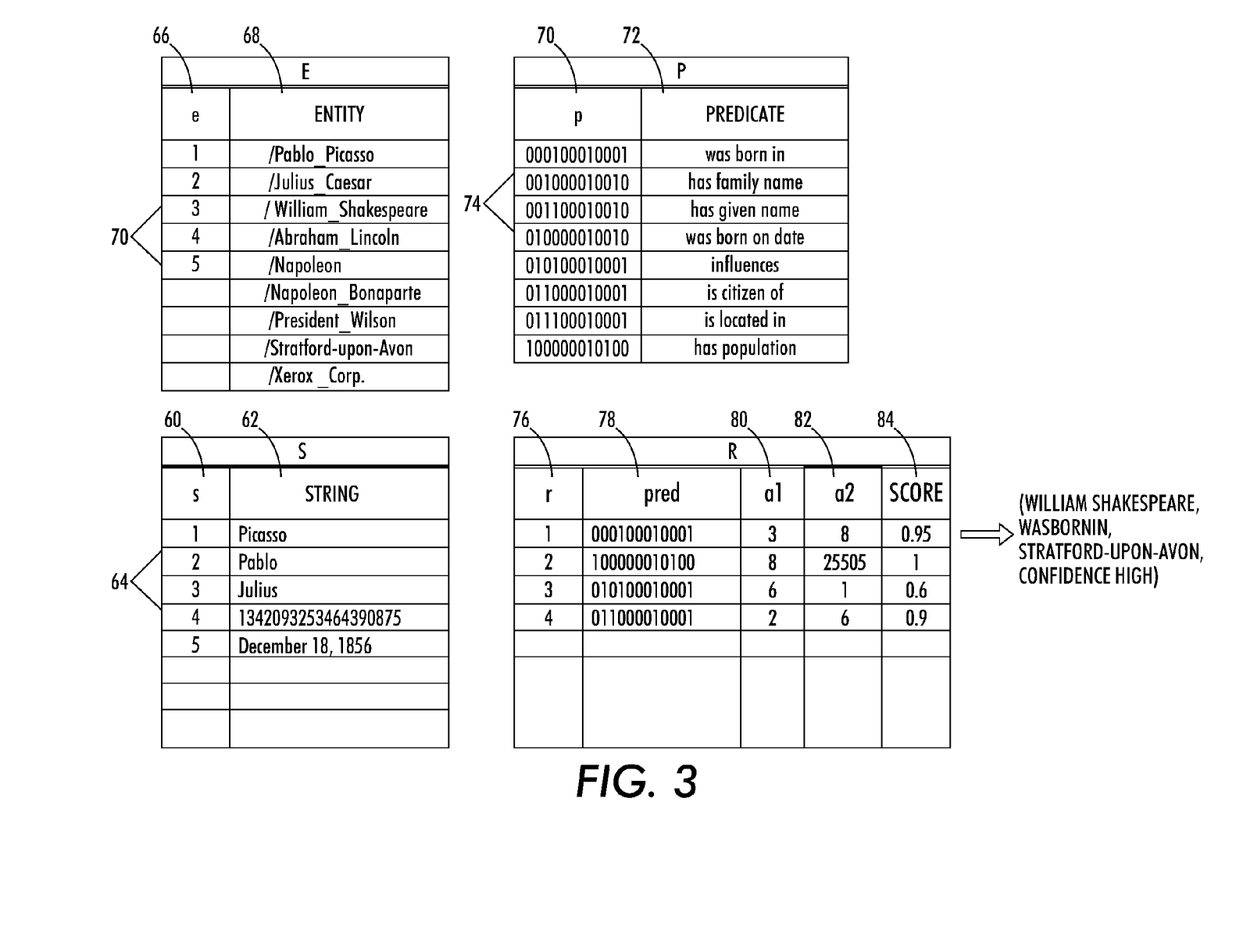
FIG. 3 illustrates example tables.

The tables 20, 22, 24, 26 shown in FIG. 3 are for illustration only. It is to be appreciated that the storage of and entries represented in these tables are generated in the appropriate RDBMS language, such as SQL or a variant thereof. In the following discussion commands are shown in the SQL dialect of SQLite3, by way of example, recognizing that other RDBMS can be used.

4.1 String Table

In creating the string table 20, the string literals extracted from the information 38 are "interned", i.e., each distinct string is mapped with a unique integer identifier (unique within the string table) s that will represent the string in the relations table 26. In SQLite3, this table is created and indexed with the following commands:

CREATE TABLE S (id INTEGER PRIMARY KEY, exId VARC

CREATE INDEX Sindex ON S (extId);

The first command creates a row entry and the second command indexes it so that it can be retrieved.

The string table 20 (denoted Table S) therefore includes two columns 60, 62, one for the string identifier s and one for the external identifier of the string, which is its value. Each string value is a finite sequence of symbols that are chosen from a predefined set of symbols (called an alphabet). A string value can thus include letters, numbers, spaces, punctuation marks, combinations thereof and so forth.

The string identifier s for each row 64 of the table 20 is thus an integer, which is an identifier for the corresponding string value. As new strings are identified in the knowledge base, they are sequentially assigned a new identifier s. For example, the first string identified is given the identifier 1, the next is given the identifier 2, and so forth in sequential fashion (expressed in binary code). This reduces the storage space for strings which are large, i.e., for those which are longer than the number of bytes required to represent the identifier s.

Examples of strings which are stored in this way include family names, given names, dates (except for those which are recognized as entities).

4.2 Entity Table

In general, an entity is anything that is not a literal, not a predicate and not a relation (e.g. a person, an organization, a location, etc.).

The entity table 22 (denoted Table E) includes two columns 66, 68, one for the entity identifier e and one for the external identifier of the entity, which is its value.

In some embodiments, the entity value is the name of the entity, such as a person name, company name, location name, or the like. In other embodiments, the value of the entity is a unique character string that constitutes a reference to an Internet resource describing the entity (its URL). For example, the entity value: http://en.wikipedia/ . . . /william_shakespeare may be used for the entity William Shakespeare. Once again, the value of the entity is generally longer than 8 bytes, such that using the identifier reduces the storage space.

The entity identifier for each row 70 of the entity table is an integer, which is a unique identifier (unique within the entity table) for the corresponding entity value. As for the strings, as new entity values are identified in the knowledge base, they are each assigned a respective unique identifier in sequence.

In creating the entity table 22, entity external identifiers (i.e., names) are interned. In SQLite3, the following commands can be used:

CREATE TABLE E (id INTEGER PRIMARY KEY, extId VARCHAR);

CREATE INDEX Eindex ON E (extId);

The first command creates a row entry and the second command indexes it so that it can be retrieved.

4.3 Predicate Table

In creating the predicate table 24 (denoted Table P), each predicate is mapped to a respective integer p. The predicate table 24 includes two columns 72, 74, one for the predicate identifier p and one for the external identifier of the predicate, which is its value.

In SQLite3, the following commands can be used to create the table:

CREATE TABLE P (id INTEGER PRIMARY KEY, extId VARCHAR);

CREATE INDEX Pindex ON P (extId);

The first command creates a row entry and the second command indexes it so that it can be retrieved.

As for the entities and strings, each predicate is assigned a integer as its identifier p, which is unique within the predicate table. Each predicate has constraints on the types of arguments it can take. The identifier of the predicate p in the table depends not only on the predicate's order number p', but also on its respective argument types $t_1$ and $t_2$. In particular, the predicate identifier p is composed of three parts:

1. The order number p' of the predicate (as for the entities and strings, this is a number, i.e., 1 for the first predicate added to the knowledge base, 2 for the second, etc. . . . ). This can be encoded, for example, in the first two (or more) bytes of the identifier p; and 2. Identifiers $t_1$ and $t_2$ for the pair of types of the arguments that can be linked with this property. These are selected from the predefined argument types, Arg-string, Arg-predicate, Arg-entity, Arg-relation, Arg-integer, etc. Each type t of argument is encoded as a respective, different number. Due to the small number of argument types (five types in the exemplary embodiment), the encoding of each of the two argument types $t_1$ and $t_2$ can be readily achieved on 4 bits of the predicate identifier (i.e., using the numbers from 0 to 15). The types of the two arguments are therefore encoded on one byte (8 bits) of the identifier p. In the exemplary embodiment, the types $t_1$ and $t_2$ are encoded on the least significant byte of the predicate identifier p, while the predicate order number p' is encoded in the remaining bytes. However, it is to be appreciated that the positions of the three encodings p', $t_1$ and $t_2$ could be otherwise arranged in p.

Thus, for example, consider information 38 of the type: President Woodrow Wilson was born on Dec. 28, 1856. The predicate used for this information is wasBornOn, which can have, as its first argument, in this example, an entity type argument Arg-entity (President Woodrow Wilson) and as its second argument, a string-type argument Arg-string (Dec. 28, 1856). Suppose that this predicate is given, as its own order number identifier p', (in binary) the integer 00000101 and the types of arguments are given the integers Arg-string=0001, Arg-predicate=0010, Arg-entity=0011, Arg-relation=0100, Arg-integer=0101. Then, the predicate identifier p for was-BornOn, which includes order number identifier p' together with the identifiers 0011 and 0001 of the two argument types $t_1$ and $t_2$ is thus 0000010100110001. In this example, only one byte is used for the predicate order number p'. However, it is to be appreciated that less than one byte two or more bytes can be used.

4.4 Relations Table

The relations table 26 (denoted Table R) has 5 columns or slots 76, 76, 80, 82, 84 for each row. These are a ROWID (r) slot that serves as the unique identifier (unique within the relations table) of the relation and is used for reification; a predicate identifier p; the identifier of the first argument of the relational; the identifier or value of the second argument a2; and finally the probability or confidence score.

The relation identifier r allows the relation to be referred to in another relation. The predicate identifier p corresponds to one of the predicate values in the predicate table and denotes the argument types. The identifiers of first and second arguments of the relation a1 and a2 correspond to values in a respective one of the tables (string, predicate, entity, or relation), as prescribed by the argument type identifiers in p. The probability or confidence score can have a value which is higher for a relation in which there is more confidence that it is factually correct. This is useful in case the relations stored in the knowledge base are extracted, for example, by an automatic process and the process assigns a measure of the reliability of the extracted relation as the score.

The relation identifier r can be assigned sequentially, as each new relation is added to the knowledge base. For example, the first relation to be added to the knowledge base is assigned the identifier 1, the next one 2, and so forth.

The following SQLite3 commands can be used to create the relations table and its indexes accordingly:

CREATE TABLE R (id INTEGER PRIMARY KEY, p BIGINT, a1 BIGINT, a2 BIGINT, score DOUBLE);

CREATE INDEX SPOindex ON R (a1,p,a2);

CREATE INDEX OPSindex ON R (a2,p,a1);

CREATE INDEX PSOindex ON R (p,a1,a2);

The first command creates a row entry and the second, third and fourth commands create indexes a1, a2, and p respectively, so that each can be retrieved. Depending on the application, the relation may be accessed with a1, a2, or p, or more generally, with two of these (and optionally a constraint on the score), to retrieve information from the knowledge base.

If an argument is a numeric literal (integer or floating point) then its value can be directly stored in the relation, otherwise, it is the unique identifier of the argument that is stored. As will be appreciated, since an entity can have the same integer as its identifier as a string, predicate or other relation, the integer stored in a1 (or a2) is not sufficient, of itself, to uniquely point to the entity. Rather, the argument type, stored in p is used to denote which table 20, 22, 24, or 26 is to be used to identify the value of the respective argument. Thus, the predicate integer p is used to identify the argument type t which identifies the specific one of the tables which is to be accessed with the a1 or a2 integer, or in the case of a numeric literal, that the slot contains the value.

For example, if the first argument in a relation is an entity, such as a company name, and the second argument is a number of employees of the company, the identifier e of the entity is stored in the a1 slot and the number of employees is itself is stored in the a2 slot. The entity argument type $t_1$ stored in p indicates that the slot a1 contains an identifier which is used to address the entity table. The integer argument type $t_2$ stored in p indicates that the slot a2 contains the value of arg2, i.e., it is not an identifier to be used in addressing one of the tables.

5. Populating the KB (S112)

The KB 30 is populated by adding relations (S114 in FIG. 2) using information 38. Each time a relation is added to the KB, it is assigned a relation identifier r and this identifier is returned by the procedure. In this way, every relation can be reified and relations can say things about other relations. For example another relation could be used to identify the source, spatial, or temporal information of the relation. As an example, this could be used in a second relation to provide the date on which the information used to generate a first relation was added to the knowledge resource 32.

Figure 4:
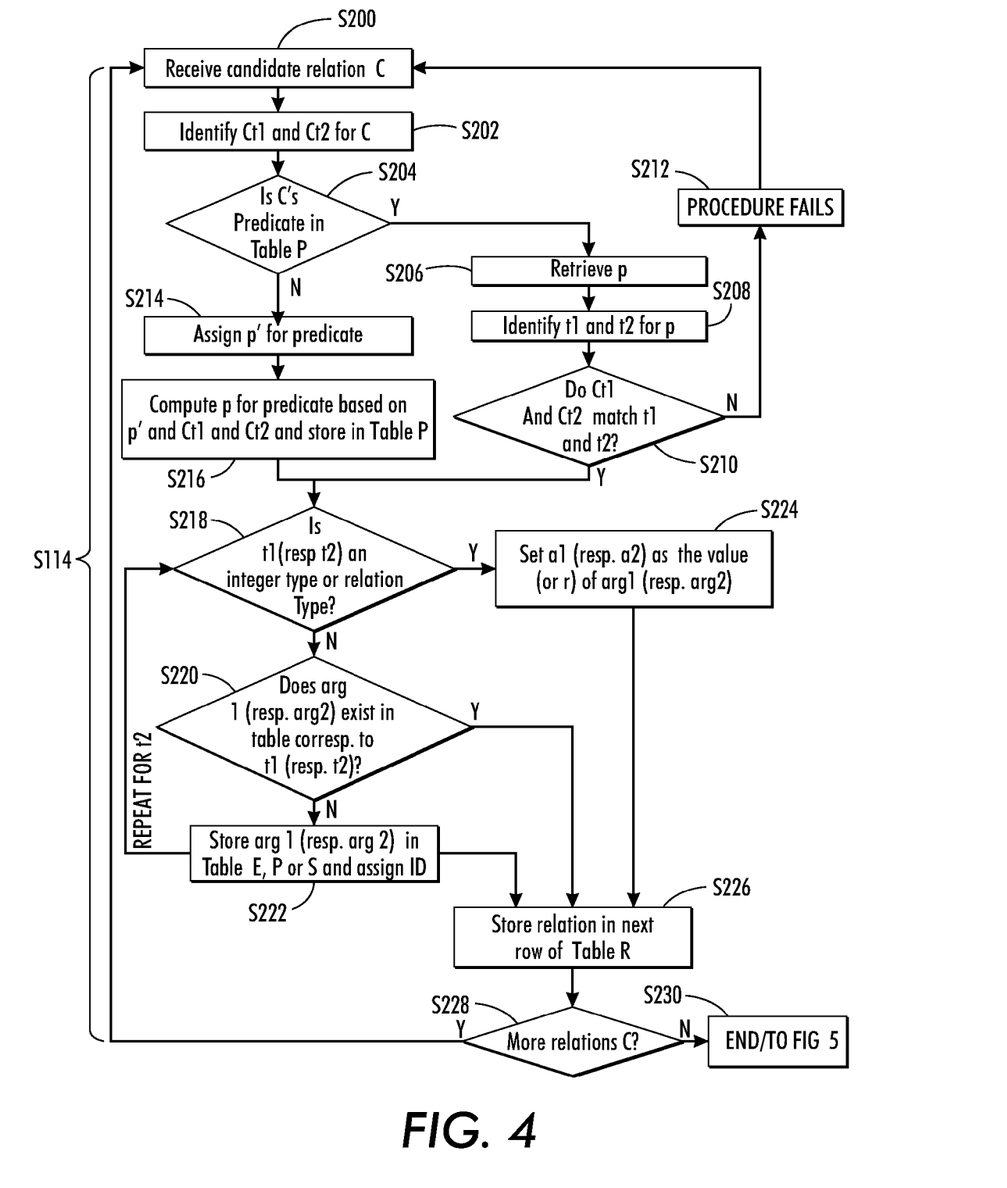
FIG. 4 is a flow diagram which illustrates adding a record to the knowledge base in the method of FIG. 2.

Adding a relation can be performed as illustrated in FIG. 4, as follows:

At S200, information 38 specifying a new candidate relation C is received. C can be a quadruple of the form (predicate, arg1, arg2, score) or a triple of the form (predicate, arg1, arg2), where the score is automatically assigned as 1 by default. The information may also specify the types of the two arguments arg1, arg2 using a recognizable syntax, which can be explicit or implicit.

At S202, the type $Ct_1$, $Ct_2$, of each argument is identified where: $Ct_1$ is the type of the first argument arg1, and Cr, is the type of the second argument arg2 in C. For the example, $Ct_1$ and $Ct_2$ are both recognized as being of type Arg-entity with an identifier of 0001. Ct, and Cr, may be identified from the information received at S200. In other embodiments, the method may use suitable grammar rules for identifying the types. As an Example consider the candidate relation (wasBornIn, Willliam_Shakespeare<entityperson>, Cornwall<entitylocation>, 0.4).

At S204, the predicate table P is accessed to determine whether the predicate already exists as a value in the predicate table. In the example case, suppose that wasBornIn is already present as a value in column 72 of P.

If at S204 the predicate exists in Table P, the predicate identifier p corresponding to the predicate value is retrieved at S206. In the example, since the predicate wasBornIn is present in the table 24, its identifier p is retrieved, e.g., 0000000100010001, as in the table illustrated in FIG. 3 (where only 1 byte is used for the predicate order number for simplicity).

At S208, given p, the types $t_1$ and $t_2$ of the two arguments required by p are identified (these types are stored in the last byte of p as discussed above). In the example case, these types both have the identifiers 0001, which corresponds to the entity type.

At S210, the identified types $t_1$ and $t_2$ in p are compared with $Ct_1$ and $Ct_2$ to determine if they compatible. If they are not compatible (i.e., $Ct_1 \neq t_1$ and/or $Ct_2, \neq t_2$) the procedure fails at S212 and no relation is added for this candidate relation C. Thus is because the schema only permits each predicate to have a respective, single pair of types $t_1$ and $t_2$. The method may then return to S200 for the next new relation. In other embodiments, a new predicate can be instantiated with a different value and types $Ct_1$ and $Ct_2$.

If at S204, the predicate does not yet exist in the table, i.e., is new, an order number p' is assigned to the predicate at S214, which is the next order number in the sequence of predicate order numbers.

At S216, a predicate identifier p is computed for the predicate using the order number assigned at S214 and using $Ct_1$ and $Ct_2$ as $t_1$ and $t_2$, as explained in section 4.3 above. The predicate is stored in predicate table along with p as the key.

At S218, a determination is made as to whether $t_1$ is a numeric or a relation type.

If at S218, $t_1$ is not an integer type nor a relation type, the table 20, 22, or 24 corresponding to $t_1$ is accessed at S220 to determine if arg1 exists as an entry (value) in the table. If arg1 exists, $a_1$ is identified for arg1 from the table corresponding to type $t_1$ (S216). $a_1$ is then the identifier e, p, or s corresponding to the value arg1 in that table.

If at S220, arg1 does not exist, then at S222, arg1 is stored in the respective table and its new identifier (e, p, or s) is assigned. $a_1$ is then the identifier e, p, or s corresponding to the value arg1 in that table.

If at S218, $t_1$ is a numeric (arg-integer) or a relation (arg-relation) type, then at S224, $a_1$ is set as the external ID for arg1.

The method returns to S212 where argument arg2 is processed, as for arg1. $a_2$ is set as the identifier (e, p, or s) or external ID for arg2.

At S226, let r be the ROWID of the next empty row in the relations table R. The relation (r, p, $a_1$, $a_2$, score) is then stored at row r and r is returned as the identifier. This automatically updates the indexes of the table, as noted above.

Optionally, after S226, another record may be created in the relations table R which includes, as one of its arguments, the identifier r of the new record and as the other of its arguments, information about the newly added relation (as a value, string ID, or entity ID). The information, as an example, may correspond to the date on which the information in the RDF triple was added to the resource database 32. The predicate identifier in this case will correspond to the predicate table entry wasAddedon(date).

If at S228 there are more candidate relations C, the method returns to S200, otherwise to S230, where the method ends or waits until new information is available.

6. Method for Querying the Knowledge Base 30

Querying relations can be performed with any suitable KB query language, e.g., Simple Protocol and RDF Query Language (SPARQL), or other SQL query language.

The translation of a single relation pattern query 48 to the corresponding SQL query is straightforward: The instantiated values will be part of the SQL "WHERE" conditions, while the non-instantiated variables are translated into the column names in the SELECT part of the SQL query. This can be performed with a conventional translation process, except in the additional step of checking the compatibility between the types of instantiated arguments and the types defined for the predicate in its identifier (see section 4.2.3), as required by the predefined relational schema.

Figure 5:
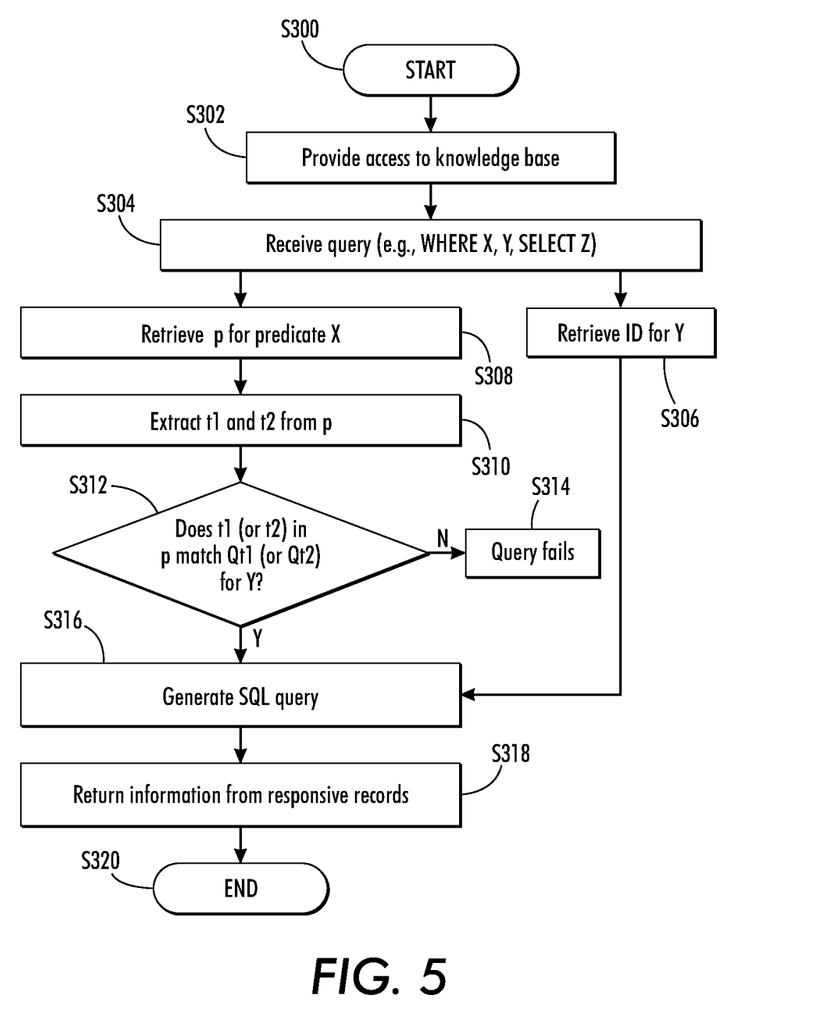
FIG. 5 is a flow diagram which illustrates a method for querying the knowledge base of FIG. 1 in accordance with another aspect of the exemplary embodiment.

FIG. 5 illustrates an exemplary method of querying the knowledge base 30. The method begins at S300.

At S302, access to a knowledge base 30 is provided. At S304, a query 48 is received. This can be of the general form "WHERE X, Y, SELECT Z." For example, if the query seeks the entities in the knowledgebase with family name Dupont, a KB query of the format hasFamilyName(?e "Dupont") may be received in KB query language, meaning "get all entities e from the KB that have "Dupont" as a family name".

At S306, the ID for Y is received from the appropriate table. In the example case, the search engine 42 retrieves the identifier for the string literal Dupont from the string table. If the string literal does not exist in the string table, the query fails.

At S308, the ID for X is received from the appropriate table. In the example case, the search engine retrieves the identifier p of the predicate (in this case, the predicate ID for hasFamilyName) from the predicate table. If the predicate does not exist in the predicate table, the query fails.

At S310, the argument types $t_1$ and $t_2$ stored in p are retrieved and at S312 are compared with the argument type $Qt_1$ or $Qt_2$ of the query. In the example case, the query hasFamilyName has a string type argument $Qt_2$ (Dupont is a string) which matches the argument type in p.

If the second argument type encoded in p is not the string type, then the query fails at S314. Otherwise, at S316, the query is translated into an SQL query. In the example case, the SQL query is of the form:

SELECT a1 FROM R WHERE a2=s AND pred=p;

In the example above, s is the ID of the string "Dupont" and p is the ID of the predicate hasFamilyName The query is then applied to the relations table (S318). For each returned value $a_1$, and depending on its type $t_1$ encoded in p, the external value or name of $a_1$ is looked up in the corresponding table and returned to the user as the query response. The method ends at S320.

As will be appreciated, complex queries that involve more than one relation pattern (conjunctions, disjunctions) are interpreted by combining the results yielded from running the basic queries, as in any standard query interpreter. For example, the query "has family name Dupont and was born in Paris" can be expressed in two queries and the intersection of the results is identified.

The method illustrated in one or more of FIGS. 2, 4, and 5 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in one or more of FIGS. 2, 4 and 5, can be used to implement the methods disclosed herein.

As will be appreciated, the steps of the methods illustrate in FIGS. 2, 4, and 5 need not all proceed in the order illustrated and fewer, more, or different steps may be performed.

Without intending to limit the scope of the exemplary embodiment, the following example demonstrates the implementation of a system for generating a knowledge base and its use in querying.

EXAMPLE

A prototype KB system 10, referred to herein as SKB (Simple KB), has been implemented following the relational schema disclosed herein. SKB is a KBMS that is backed by the SQLite RDBMS, a simple, and widely used RDBMS which is in the public domain. This RDBMS implements most of the SQL standard. SQLite stores the entire database (definitions, tables, indices, and the data itself) as a single cross-platform file on a host machine 10. However, it is to be appreciated that other RDBMS could be used (i.e., other than SQLite).

The exemplary SKB system 10 is compared with three conventional knowledge bases which use the RDF triple.

1. Jena/TDB: a free open source RDF store that has a native storage engine (TDB). This is the most widely used RDF store.

2. Virtuoso: a commercial RDF store from OpenLink Software.

3. BigOWLIM: a commercial RDF store from Ontotext AD.

Virtuoso and BigOWLIM are known for usually getting the best results in published benchmarks.

The test data were drawn from the Yago semantic knowledge resource 32, version 2009-w42-2, which has been derived from Wikipedia and WordNet. (see Suchanek, F. M., Kasneci, G., and Weikum, G., Yago: A Core of Semantic Knowledge, In 16th international World Wide Web conference (WWW 2007) ACM Press (New York, N.Y., USA, 2007), for a description of the Yago system. To shorten the loading time during tests, only a subset of the Yago data was used, that is:

36.2 million relations;

84 distinct predicates (type, hasFamilyName, hasGivenName, bornIn, bornOnDate, is CitizenOf, hasPopulation, influences, hasRevenue, is MemberOf, locatedIn, etc.);

3 million entities; and 3 million string literals.

All tests were run on a common laptop: CPU: Intel Core 2 Duo 19600 2.8 GHz, 4 GB RAM, HD: 7200 rpm SATA 3.0 Gb/sec, Cache 16 MB, OS: Windows 7 Professional SP, with one exception: due to practical reasons, data loading steps for Jena/TDB and BigOWLIM (presented in Table 1) were run on a Linux common desktop.

Table 1 shows the times of the bulk loading of the test data into the KB systems, including indexing, and the final size of the resulting KBs. Note that SKB read the source data in the (concise) Yago native format, versus RDF-XML format for the other 3 systems, which caused some processing overhead due to the parsing of verbose XML. The size of the exemplary SKB was the smallest.

TABLE 1

Comparative evaluation of loading time and KB size

|  | Loading Time in min | Average factor (×SKB) | KB Size in GB | Average factor (×SKB) |
|---|---|---|---|---|
| SKB | 45 |  | 3.5 | — |
| Jena/TDB | 1200 | (×26.6) | 29.4 | (×8.4) |
| BigOWLIM | 360 | (×8.0) | 20.1 | (×5.7) |
| Virtuoso | 145 | (×3.3) | 9.7 | (×2.8) |

Tables 2, 3 and 4 show the results of query answering speed tests. Cold runs are preceded by a machine reboot to ensure that both the OS file system cache and the KB system cache are empty when the query is run. A warm run measure is the average time obtained over the last 10 runs of a sequence of 11 runs of the same query without exiting the test program, ensuring that the KB system can use cached data. Finally, in the "different instantiations" test, the KB systems were first warmed up by instantiating the query templates with 100,000 input values, and then tested by running the query templates with 5K randomly chosen unseen input values (i.e., unseen during the warm up).

TABLE 2

Query answering performance (in milliseconds): cold run

|  | Q1 | Q2 | Q3 | Average factor (×SKB) |
|---|---|---|---|---|
| SKB | 110879 | 159885 | 1172707 | — |
| Jena/TDB | 852776 | 1827328 | 3380909 | ×7.33 |
| BigOWLIM | 1361675 | 1540102 | 14077272 | ×11.20 |
| Virtuoso | 245852 | 779534 | 1207736 | ×2.70 |

TABLE 3

Query answering performance (in ms): warm run

|  | Q1 | Q2 | Q3 | Average factor (×SKB) |
|---|---|---|---|---|
| SKB | 5711.00 | 10839.00 | 88488.00 | — |
| Jena/TDB | 23950.56 | 28843.44 | 117020.60 | ×2.73 |
| BigOWLIM | 21675.56 | 39460.89 | 11990307.00 | ×47.46 |
| Virtuoso | 199216.80 | 263265.30 | 573850.30 | ×21.00 |

TABLE 4

Query answering performance (in ms): with different instantiations (after warm up)

|  | Q1 | Q2 | Q3 | Average factor (×SKB) |
|---|---|---|---|---|
| SKB | 1018 | 1089 | 6519 | — |
| Jena/TDB | 9000 | 47721 | 70269 | ×21.13 |
| BigOWLIM | 19570 | 20125 | 582690 | ×42.23 |
| Virtuoso | 5414 | 16539 | 16841 | ×7.63 |

These results demonstrate the efficiency of the SKB over the existing systems. In all these tests, the SKB outperformed the others.

Some differences between the present SKB and existing systems may be noted.

There are two main classes of RDBMS-based knowledge stores, defined according the nature of the relational schema in use. See Haslhofer, B., Roochi, E. M., Schandl, B., and Zander, S. Europeana RDF store report. Technical report, University of Vienna, Vienna, March 2011, for a discussion of these:

1. Ontology-Specific Schemas:

knowledge elements are stored in relational schemas that follow the structural properties of a specific ontology of a application domain. An example of this approach is the one-table-per-ontology-class schema. The main limitation of this approach is that changes in the ontology (e.g., adding a new property or a new class) requires changes in the relational schema, which can be costly especially in the one-table-per-class schema.

2. Generic Schemas:

the relational schema in use does not depend on a specific ontology, but on the generic concepts of relations (RDF triples), entities and literals. Systems of this type are described, for example, in Alexaki, S., Christophides, V., Karvounarakis, G., and Plexousakis, D., "On storing voluminous RDF descriptions: The case of web portal catalogs," in 4th Intl Workshop on the Web and Databases (WebDB) (2001), pp. 24-25; Abadi, D. J., Marcus, A., Madden, S. R., and Hollenbach, K., "Scalable semantic web data management using vertical partitioning," in Proc. 33rd Intl Conf. on Very large data bases (Sep. 23-27, 2007), VLDB '07, VLDB Endowment, pp. 411-422; and in US Pub. No. 2006/0235823 to Chong, et al.; US Pub. No. 2009/0138498, to Krishnamoorthy, et al.; and U.S. Pat. No. 7,979,455 to Krishnamoorthy, et al., the disclosures of which are incorporated herein by reference.

The present system is more similar to the latter type. However, in the present SKB, the relational schema being used to represent and store knowledge elements (entities, literals, predicates and relations) in the KB are defined differently. For example, in the Jena2/SDB system, which is also RDBMS-based with a generic schema, there are 2 different statement tables: one for reified statements, another for non-reified statements. String literals and resource URLs are not systematically interned (or normalized). In addition, the predicate, subject and object columns contain strings (VARCHAR) that encode information about the real values whether they are interned or not. See Jena2. Jena2 Database Interface-Database Layout. Web Page: http://openjena.org/DB/layout.html.

The Jena/TDB system is another widely used knowledge store. However it is not RDBMS-based and has a native store engine called TDB. Jena/TDB. A description can be found at TDB Architecture. Web Page: http://openjena.org/wiki/TDB/Architecture, 2009. Reified relations cannot be directly represented in its RDF triple table and are treated as named graphs. This could cause a significant computational overhead, given that reification is frequently used in large knowledge resources like Yago, due to the source, spatial and temporal information on statements. The relations table/indexes in this system do not have slots for a probability or a confidence score. All "interned" nodes (entities, predicates, string literals) are stored in a single table (called the node table or dictionary). Floating point values are not inlined in the relation tables, they are interned in the node table in the same way string literals are. Consequently, to answer a query with a comparison filter on a real number (e.g. x has a weight greater than some real number value), the query engine cannot directly use the (sorted) relation indexes. It needs to first go through the interned values in the dictionary, which is computationally costly. Finally, the types of nodes (i.e., relation arguments) are not encoded in the predicate slot.

Details of how data is internally stored in commercial systems like Virtuoso and BigOWLIM is not readily available. However, the surprisingly large difference in size of the resulting KB files (see Table 1) is a strong indication of significant differences between the data schema disclosed herein and the likely data schemas of Virtuoso and BigOWLIM.

An advantage of the present system is that the relational schema that has been defined to represent and store relations/facts in an RDBMS as disclosed herein allows for efficient loading of data and efficient query answering, as the evaluation results show.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A knowledge base system comprising:
   memory which stores a knowledge base and a knowledge base management system which includes instructions for at least one of adding relations to the knowledge base and querying the knowledge base, the knowledge base comprising:
   a relations table and a plurality of linked tables, a first of the linked tables comprising a predicate table, the relations table including slots which, for each of a plurality of rows of the relations table, respectively store a relation identifier, a predicate identifier, and first and second arguments of a respective relation;
   wherein each predicate identifier in the respective predicate identifier slot is composed of:
   a first part which encodes a key for a respective entry in the predicate table,
   a second part which encodes a first argument type for the first of the arguments stored in the respective row of the relations table, and
   a third part which encodes a second argument type for the second of the arguments stored in the respective row of the relations table;
   wherein the first and second argument types are selected from a predefined set of argument types, one of the argument types in the set being associated with a second of the linked tables, another of the argument types in the set being associated with a third of the linked tables or with the predicate table, one of the first and second arguments in a row of the relations table serving as a key to an entry in the second linked table when the respective part of the predicate identifier for that row encodes the associated argument type for the second linked table and serving as a key to an entry in the third linked table or the predicate table when the respective part of the predicate identifier for that row encodes the associated argument type for the third linked table or the predicate table; and
   a processor which executes the instructions.

2. The system of claim 1, wherein the argument types in the predefined set of argument types are selected from the group consisting of argument types for integers, string literals, entities, other predicates in the predicates table, and other relations in the relations table.

3. The system of claim 2, wherein the argument types include an argument type for integers, and wherein when the predicate identifier encodes the argument type for integers as being the argument type for the second of the arguments in the respective row of the relations table, an integer value is included in the second argument slot.

4. The system of claim 1, wherein the argument types in the predefined set of argument types comprise an argument type for each of integers, string literals, entities, other predicates in the predicates table, and other relations in the relations table.

5. The system of claim 1, wherein the second linked table includes a table of entities, whereby when the predicate identifier encodes an argument type for entities, the respective first or second argument of the respective relation serves as a key for an entity value in the entity table.

6. The system of claim 1, wherein one of the at least second linked table is a table of strings, whereby when the predicate identifier encodes a string argument type, the respective first or second argument of the relation serves as a key for a string literal value in the string table.

7. The system of claim 1, wherein the set of argument types includes at least three argument types.

8. The system of claim 7, wherein the set of argument types includes at least four argument types.

9. The system of claim 1, wherein each of the set of argument types is assigned an identifier with which it is able to be encoded in the predicate identifier.

10. The system of claim 1, wherein the predicate identifier encodes a predicate order number as a first part of the predicate identifier, and the argument types as second and third parts of the predicate identifier, each of the parts occupying a predetermined number of bytes.

11. The system of claim 1, wherein the plurality of linked tables includes three liked tables, each of the three linked tables being associated with a respective argument type.

12. The system of claim 1, wherein each of the relations stored in the knowledge base has its own unique relations identifier.

13. The system of claim 1, wherein the relations table further includes a slot which, for each of a plurality of rows of the relations table, stores a confidence score for the respective relation.

14. The system of claim 1, wherein the knowledge base management system uses a structured query language.

15. A knowledge base system comprising:
memory which stores a knowledge base and a knowledge base management system which includes instructions for at least one of adding relations to the knowledge base and querying the knowledge base, the knowledge base comprising:
a relations table and a plurality of linked tables, a first of the linked tables comprising a predicate table, the relations table including slots which, for each of a plurality of rows of the relations table, store a relation identifier, a predicate identifier, and first and second arguments of a respective relation;
each predicate identifier encoding:
a key for a respective entry in the predicate table
a first argument type for the first of the arguments in the respective row of the relations table, and
a second argument type for the second of the arguments in the respective row of the relations table;
the first and second argument types being selected from a predefined set of argument types, one of the argument types in the set being associated with a second of the linked tables, one of the first and second arguments in a row of the relations table serving as a key to an entry in the second linked table when the predicate identifier for that row encodes the associated argument type;
wherein the knowledge base management system includes instructions for adding relations to the knowledge base and the instructions are configured for:
receiving a triple comprising first and second arguments and a predicate;
determining if the predicate exists in the predicate table and if so, retrieving its predicate identifier; otherwise, providing for creation of a new entry in the predicate table with a respective new predicate identifier and retrieving the new predicate identifier;
determining if argument types of the first and second arguments in the triple match the argument types encoded in the predicate identifier;
if the argument types of the first and second arguments in the triple match the argument types encoded in the predicate identifier, for at least one of the arguments in the triple, determining if the argument exists in the linked table corresponding to the encoded argument type, and if so retrieving its identifier, and if the argument does not exist, adding the respective argument as a new entry in the entity table with a respective identifier; and
if a record does not yet exist in the records table, creating a new record in the records table which includes the argument identifier of the at least one argument and the retrieved predicate identifier; and
a processor which executes the instructions.

16. The system of claim 1, wherein the knowledge base management system includes instructions for querying the knowledge base, and the instructions are configured for:
receiving a query comprising at least one of:
a first argument corresponding to one of the entries in one of the linked tables,
a second argument corresponding to one of the entries in one of the linked tables or to a value in one of the records, and
a predicate corresponding to one of the predicates in the predicate table;
where the query includes the predicate, retrieving the predicate identifier of the predicate, identifying the encoded argument types of the predicate, and using at least one of the identified argument types to access a respective one of the linked tables with an argument identifier stored in one of the records in the records table that is responsive to the query.

17. A method for updating a knowledge base comprising:
providing a knowledge base comprising a relations table and a plurality of linked tables, a first of the linked tables comprising a predicate table, the relations table including slots which, for each of a plurality of rows of the relations table, store a relation identifier, a predicate identifier, and first and second arguments of a respective relation, each predicate identifier encoding a key for a respective entry in the predicate table, a first argument type for the first of the arguments in the respective row of the relations table, and a second argument type for the second of the arguments in the respective row of the relations table, the first and second argument types being selected from a predefined set of argument types, one of the argument types in the set being associated with a second of the linked tables, and one of the first and second arguments in a row of the relations table serving as a key to an entry in the second linked table when the predicate identifier for that row encodes the associated argument type;
receiving a triple comprising first and second arguments and a predicate;
with a processor, determining if the predicate exists in the predicate table and if so, retrieving its predicate identifier; otherwise, providing for creation of a new entry in the predicate table with a respective new predicate identifier and retrieving the new predicate identifier;
determining if argument types of the first and second arguments in the triple match the argument types encoded in the predicate identifier;
if the argument types of the first and second arguments in the triple match the argument types encoded in the predicate identifier, for at least one of the arguments in the triple, determining if the argument exists in the linked table corresponding to the encoded argument type, and if so retrieving its identifier, and if the argument does not exist, adding the respective argument as a new entry in the entity table with a respective identifier; and
if a record does not yet exist in the records table, creating a new record in the records table which includes the argument identifier of the at least one argument and the retrieved predicate identifier.

18. A method for querying a knowledge base comprising:
providing the knowledge base of claim 1;
receiving a query comprising at least one of:
a first argument corresponding to one of the entries in one of the linked tables, a second argument corresponding to one of the entries in one of the linked tables or to a value in one of the records, and a predicate corresponding to one of the predicates in the predicate table; and where the query includes the predicate, retrieving the predicate identifier of the predicate, identifying the encoded argument types of the predicate, and using at least one of the identified argument types to access a respective one of the linked tables with an argument identifier stored in one of the records in the records table that is responsive to the query.

19. A method for generating a knowledge base system comprising:

providing in memory a knowledge base comprising a relations table and a plurality of linked tables, a first of the linked tables comprising a predicate table, the relations table including slots which, for each of a plurality of rows of the relations table, store a relation identifier, a predicate identifier, and first and second arguments of a respective relation;

with a processor, for each a plurality of candidate relations to be added to the knowledge base, the candidate relation comprising first and second arguments and a predicate which links the arguments:

determining if the predicate in the relation exists in a predicate table and if so, retrieving a corresponding predicate identifier from the predicate table, determining if argument types of the first and second arguments in the candidate relation match respective argument types that are encoded in the predicate identifier, the argument types being selected from a finite set of argument types;

if the argument types of the first and second arguments in the candidate relation match the argument types encoded in the predicate identifier, for at least one of the arguments in the candidate relation, determining if the argument exists in a respective linked table corresponding to the encoded argument type, and if so retrieving its identifier, and if the argument does not exist, adding the respective argument as a new entry in the entity table with a respective identifier; and where a record does not yet exist in the records table which includes the candidate relation, creating a new record in the records table which includes the argument identifier of the at least one argument and the retrieved predicate identifier.

20. The method of claim 19, wherein when the predicate in the candidate relation does not exist the predicate table, providing for creation of a new entry in the predicate table with a respective new predicate identifier and retrieving the new predicate identifier.

21. The method of claim 19, wherein the argument types in the predefined set of argument types are selected from the group consisting of argument types for integers, string literals, entities, other predicates in the predicates table, and other relations in the relations table.

22. The method of claim 19, wherein when the predicate identifier encodes an argument type for integers, an integer value is included in the second argument slot.

23. A system comprising memory which stores instructions for performing the method of claim 19 and a processor in communication with the memory for executing the instructions.

24. A computer program product comprising a non-transitory storage medium which stores instructions, which when executed by a computer processor perform the method of claim 19.

25. A knowledge base stored in non-transitory memory comprising:

a predicate table including for each of a set of entries, a respective predicate identifier, each predicate identifier encoding:

an order number for the predicate, a first argument type for the predicate, and a second argument type for the predicate, the first and second argument types each being selected from a predefined set of argument types;

a relations table including slots which, for each of a plurality of rows of the relations table, store a respective one of the predicate identifiers, and first and second arguments of a respective relation, each argument comprising one of an argument identifier and a value;

an entity table corresponding to one of the argument types in the set of argument types, the entity table comprising a set of entries, each entry comprising an entity identifier and a respective entity value; and a string table corresponding to another of the argument types in the set of argument types, the string table comprising a set of entries, each entry comprising a string identifier and a respective string value;

the first and second arguments in the relations table serving as a key to an entry in one of the entity table and the string table only when that table's argument type is encoded as the respective first or second argument type in the predicate identifier of the respective row.

26. The system of claim 1, wherein the predicate identifier is an integer and the first second and third parts are integers.

27. The system of claim 5, wherein the predicate identifier is an integer, the order number for the predicate is encoded as a first part of the integer, the first argument type is encoded as a second part of the integer, and the second argument type is encoded as a third part of the integer.

* * * * *